May 31, 1927.  
W. A. DRUSHEL  
1,630,837  
CONTAINER FOR DISSIPATING A FUMIGANT  
Filed Feb. 25, 1926
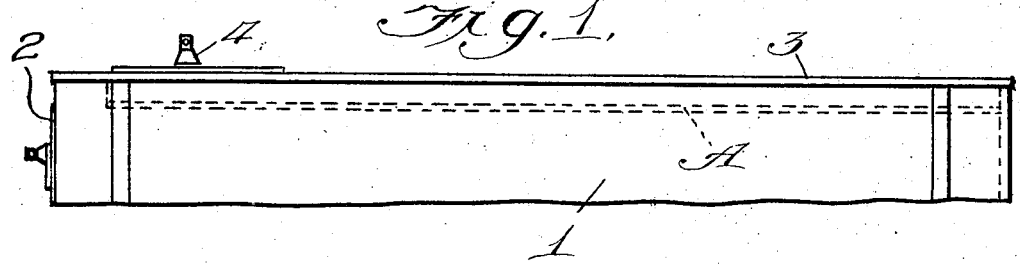
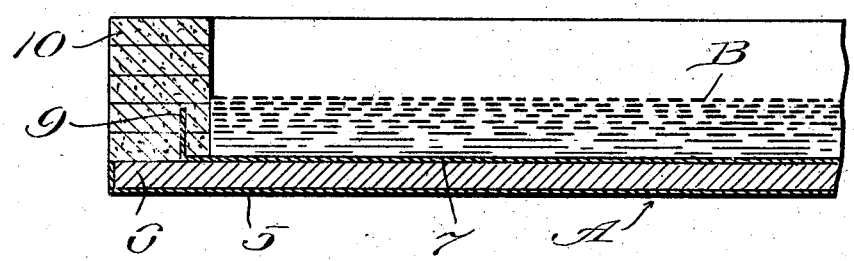
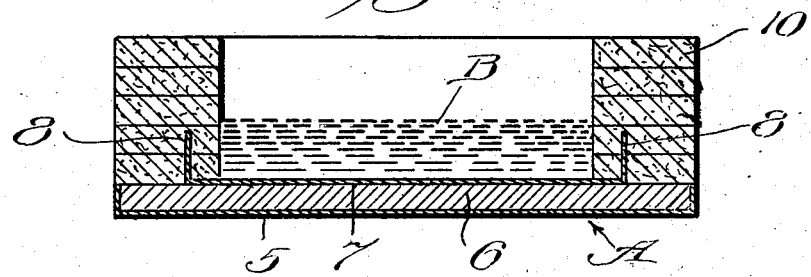
Inventor:
William A. Drushel,
by Wm. F. Freudenreich,
Atty.

Patented May 31, 1927.

1,630,837

UNITED STATES PATENT OFFICE.

WILLIAM A. DRUSHEL, OF GRAND RAPIDS, MICHIGAN, ASSIGNOR TO HASKELITE MANUFACTURING CORPORATION, A CORPORATION OF NEW YORK.

CONTAINER FOR DISSIPATING A FUMIGANT.

Application filed February 25, 1926. Serial No. 90,504.

Fabrics, furs and things made in whole or in part thereof may be protected from the ravages of moths or other insect life by sealing them up in a closed chamber and subjecting them to the action of the fumes or vapors of volatile compounds capable of destroying insect life whether in egg form or in a more developed state. The fumigant should be held in the fumigating chamber in such a way that it may vaporize freely without being spilled on the contents of the chamber in liquid form, and it should also be easy to fill the container for the fumigant.

The object of the present invention is to produce a simple and novel container for any desired quantity of fumigating liquid, which will at the same time insure effective evaporation of the liquid.

A further object of the present invention is to provide a fumigating chamber with a simple and novel container for a fumigating liquid, so constructed and arranged that the liquid may be placed in the container from a point outside of the chamber and will be prevented from entering the chamber except in vapor form.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side view of the upper portion of a fumigating vault or chamber having one of my improved containers applied thereto; Fig. 2 is a vertical longitudinal section, on an enlarged scale, through one end of the container; and Fig. 3 is a transverse section through the container.

Referring to the drawing, 1 represents a suitable vault or chamber having at the front a door 2 through which articles to be fumigated may be placed in the vault or chamber. Extending along the top of the vault or chamber is a trough-like container A the top edges of which preferably engage with the top wall 3 of the vault; the container being closed at both ends as will hereinafter be explained. In the top wall of the vault is an inlet 4 through which liquid may be poured into the container.

The details of the container are shown in Figs. 2 and 3. Referring to these figures, 5 represents a long narrow shallow pan of metal within which is fitted a body member 6 of any suitable material, the body member completely filling the pan. Upon the body member 6 is placed a shallow pan 7 that is somewhat narrower and somewhat shorter than the pan 5. The side walls 8 and the end walls 9 extend upwardly, while the bottom wall lies flat on the member 6. The members 5, 6 and 7 are glued together so as to form a unitary structure. The composite member just described forms the effective bottom of the trough or container whose side and end walls 10 are made of layers of absorbent material extending along the marginal portions of the bottom panel. The side and end walls 10 have grooves cut into their bottom faces to receive the side and end walls of the pan 7; thus uniting the bottom panel and the side and end walls of the trough securely and at the same time preventing an excess of the liquid B in the trough from flowing out through the lower regions of the side and end walls of the trough.

As previously stated, this trough is set into the fumigating vault or chamber against or close to the top wall. When fumigating liquid is poured into the trough, it passes through the sides of the latter by capillary action and evaporates from the external surfaces. Since the evaporation takes place along vertical surfaces spaced apart from each other, the fumes will drop down into the chamber as soon as they are formed, so as not to interfere with the vaporization of successive small quantities of liquid reaching the evaporating surfaces. Therefore my improved construction provides for efficient evaporation and delivery of the fumes, without danger of spilling liquid into the fumigating chamber during the filling of the trough or afterward.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A container for liquid to be evaporated having a bottom impervious to said liquid and sides of absorbent material, and a ledge of impervious material extending upwardly from said bottom a short distance into said sides between and spaced apart from the inner and outer surfaces of the latter.

2. A container for liquid to be evaporated having a bottom wall, a metal pan disposed thereon and having its side walls extending upwardly from the effective top surface of said bottom wall and at a considerable distance inwardly from the edges of said bottom wall, sides of absorbent material rising from said bottom wall to a height considerably above the top of said pan, said sides of absorbent material having in the bottom between the inner and outer surfaces grooves into which the sides walls of the pan extend.

3. A container for liquid to be evaporated, comprising a metal pan, a body or core filling said pan, a second pan narrower and shorter than the other pan resting on and fixed to said body or core, and sides of absorbent material of greater depth than said second pan fitting over and covering side walls of the latter.

In testimony whereof, I sign this specification.

WM. A. DRUSHEL.